United States Patent [19]

Shirley

[11] Patent Number: 5,271,653
[45] Date of Patent: Dec. 21, 1993

[54] VEHICULAR SUN VISOR

[76] Inventor: Harold J. Shirley, 133 Sagamore Rd., Tuckahoe, N.Y. 10707

[21] Appl. No.: 980,336

[22] Filed: Nov. 23, 1992

[51] Int. Cl.⁵ ............................................. B60J 3/02
[52] U.S. Cl. ................................. 296/97.8; 296/97.6
[58] Field of Search .................. 296/97.8, 97.6, 97.4

[56] References Cited

U.S. PATENT DOCUMENTS

| | | | |
|---|---|---|---|
| 4,264,100 | 4/1981 | Keeler, II | 296/97.8 |
| 4,728,142 | 3/1988 | Gavagan | 296/97.8 |
| 4,792,176 | 12/1988 | Karford | 296/97.8 |
| 5,015,027 | 5/1991 | Rifaat | 296/97.8 |
| 5,104,174 | 4/1992 | Gute | 296/97.8 |

Primary Examiner—Robert R. Song
Attorney, Agent, or Firm—Martin J. Spellman, Jr.

[57] ABSTRACT

An improved vehicle sun visor of double wall construction is open along its bottom and side edges, and frictionally engages a captive, slidable auxiliary sun shield. The shield can be pulled outwardly from the visor in varying degree at any point along the visor's open bottom and side edges to selectively and precisely block blinding sun glare which bypasses the visor. This enables a vehicle operator to maintain a clear, safer forward view, which will reduce the number of highway accidents caused by sun glare and will significantly increase driver comfort and peace of mind.

6 Claims, 1 Drawing Sheet

VEHICULAR SUN VISOR

BACKGROUND OF THE INVENTION

Since the days of the horseless carriage all vehicular sun visors have suffered from a major and dangerous deficiency. When the rising or setting sun is sufficiently low on the horizon a driver is not protected by the sun visor against sun blinding from direct rays of the sun and/or bright reflections off other vehicles. This causes highway accidents ranging in severity from minor to fatal, and every year many people are injured or killed in such accidents.

Since vehicle manufacturers have failed to provide a better sun visor design, a number of aftermarket accessory firms have promoted add-on devices which claim to remedy the sun glare problem, but which provide little if any practical benefit. These devices employ transparent tinted filter screens which fold or slide down from the bottom edge of the visor. But instead of blocking the sun's rays, they merely attenuate the rays. The rays still strike the driver's eyes, albeit with less intensity, but nevertheless greatly reduce the driver's ability to see. A further disadvantage is that these screens are always so wide that they cover most of a driver's forward vision, thereby undesirably and unsafely dimming his view of the highway ahead.

Recently one automaker has incorporated a horizontally-slidable opaque panel into its visors which offers the benefit of increased glare protection on the sides of a visor. But the problem of preventing the most dangerous and common form of sun blinding—i.e. from rays passing under the visor—has remained unsolved.

It is clear therefore that an important need exists for a fundamentally improved design for sun visors used in land, sea and air vehicles.

OBJECTS OF THE INVENTION

The primary object of my invention is to provide an improved vehicle sun visor which will significantly enhance safety during early morning and late afternoon hours, by reducing the number of injury and death-causing accidents that result from blinding sun glare.

A further object of my invention is to free vehicle operators from the discomfort, frustration, fear and stress caused by blinding sun glare.

Another object of my invention is to provide an improved sun visor which can be substituted for all current visors.

A further object of my invention is to provide an improved sun visor, simple in design and construction and low in manufacturing cost to encourage vehicle manufacturers to adopt its use immediately.

A final object of my invention is to provide an improved sun visor with such potential for enhancing highway traffic safety that government regulatory agencies in the field of transportation will be motivated to mandate its use in all future vehicles.

SUMMARY OF THE INVENTION

The sun visor of my invention is comprised of a double-wall structure formed from two flat, fairly rigid, spaced slightly apart parallel panel wall members, which are generally rectangular in shape. The panels are joined at one of their longer edges to a generally rigid bridging spacer section which preferably is formed integrally with the panels. The inner edges of the panels define a slot which extends upwardly from the bottom edge to the bridging section. Thus the visor body is open along three sides, and the structure's cross-section is an inverted elongated U.

On the inner side of the edge of one panel a continuous lip is formed along the outer and side edges. The lip projects towards the opposite inner wall, and is separated from it by a small gap.

A thin flat slidable opaque member, smaller than the visor, is held frictionally between the walls of the visor. The slidable member functions as an auxiliary sun shield which can be pulled outwardly from the visor at any point to block sun glare which is bypassing the visor. The shield is provided with a small transverse stud at its inner end which cooperates with the aforesaid inner wall lip to limit the free travel of the shield and to retain the inner end of the shield captive between the visor walls.

The shield may be circular but a preferred shape is generally rectangular, one of whose short sides is formed as a semicircle, the latter being the externally projecting end of the shield.

The coefficient of friction between the shield and visor body is such that the shield can be easily manipulated by a driver and, after being positioned, will remain in place despite the force of gravity, vehicle vibration, and vertical jarring forces arising from unevenness in the roadway. Although these two requirements are in conflict, a satisfactory compromise can be reached if the shield is made as light-weight as possible. In turn, this dictates that it should be as thin as possible, consistent with desired minimum requirements for strength and durability.

When the shield is withdrawn downwardly along the visor's bottom edge the horizontal arc of forward vision which it subtends is governed by its width and by its distance from the driver's eyes. The former is a fixed quantity, while the latter is variable and under the driver's control. This makes it possible for a visor manufacturer to choose a shield width which will provide satisfactory glare blocking under all conditions and circumstances.

The eyes-to-shield distance is determined by the fore-aft position of the driver's seat, the angle at which the seat back is adjusted, and the tilt angle of the visor. For any given driver the first two settings normally remain constant, but the third has a substantial range of movement, thanks to the visor being hinged. This enables a driver to "adjust" the effective width of the shield to match the width of the glare area, and in turn this allows him to maintain the best possible view of the road on either side of the glare area and to see considerably better than if the glare were not blocked. To the objection that the shield would prevent a driver from seeing an object directly in line with the sun, the answer is that such an object is invisible anyway without the shield. As to glare which bypasses the visor on either side or at its lower corners this too can be effectively blocked by suitably positioning the shield and adjusting the visor's tilt angle.

A finger-grip element is formed at the end of the projecting portion of the shield, shaped and sized to facilitate grasping and movement. Being slightly thicker than the shield it can also serve as an external stop to prevent the shield from being accidentally swallowed by the visor, which could occur if the shield's width were less than the depth of the slot in the visor.

In a preferred embodiment of my invention, the material from which the shield is made is completely opaque, since this is the only way to completely block glare. Despite this, the majority of people automatically assume that any auxiliary glare-reduction device should and must be made from a tinted transparent material. A vehicle manufacturer afraid of challenging this 'conventional wisdom' could in fact use a darkly tinted transparent material for the shield, and providing that its level of light transmission was low enough the results could be satisfactory enough.

To obtain the required coefficient of friction between the shield and the visor either of two methods can be used, or they can be used in combination. In the first method, the frictional effect is achieved by providing an interference fit between the shield and the visor. The visor body opening acts like jaws which lightly 'bite' the shield. The coefficient will depend on how tightly the visor is gripping the shield and on the surface finishes of the respective shield and visor areas that are in rubbing contact with one another.

The second method of producing controlled frictional engagement is to employ a small compression spring between the shield and the inner wall which has the lip. The preferred location for this spring is around the transverse stud. The coefficient will be determined by the spring strength and the aforesaid surface finishes.

The rigid bridging section to which the two body panels are joined is fitted with a central longitudinal bore, adapted to receive the conventional elongated metal rod that is universally used to support existing visors, and which also serves as a hinge pin. Because of this, plus the fact that my visor can readily exactly duplicate in plan, shape and size any current visor, it can be directly substituted for an existing visor, which is an advantage for a vehicle manufacturer. The overall thickness of my visor will be controlled by the amount of cushioning material used, in the same manner as conventional visors. Another advantage of my visor, from a vehicle maker's viewpoint, is that its simple and uncomplicated design will permit a relatively low manufacturing cost in mass production.

BRIEF DESCRIPTION OF THE DRAWINGS

In the accompanying drawing which forms a part of this specification.

ILLUSTRATIVE EMBODIMENT

Figure 1:
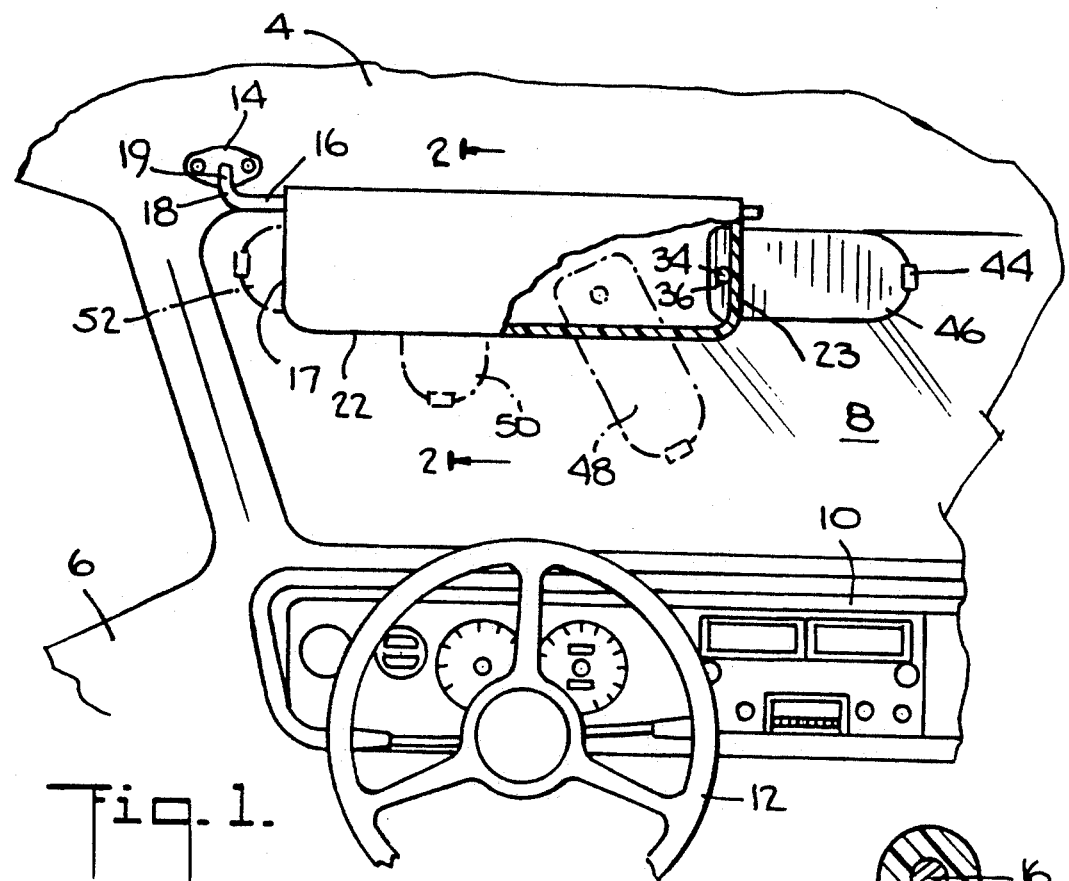
FIG. 1 plan view of the sun visor of the invention partially cut away and sectioned and showing the installation thereof in an automatic vehicle.
Figure 3:
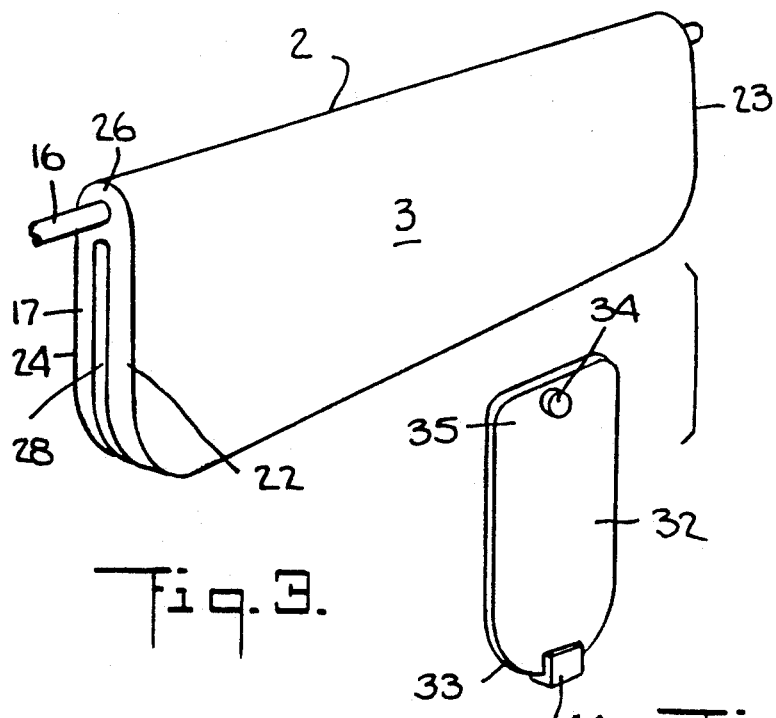
FIG. 3 is a perspective view of the sun visor of this invention partially expanded to show the adjustable visor shield extension and visor walls disassembled.

In the accompanying drawing, the improved sun visor of the present invention is indicated generally 2 having a body 3 is mounted in the usual manner to the roof 4 of the automotive passenger vehicle indicated at 6 just above and to the left of the windshield 8. The dashboard 10 and steering wheel 12 of the vehicle 6 are partially shown simply to illustrate the usual placement of a sun visor 2 in an automotive passenger vehicle.

Figure 2:
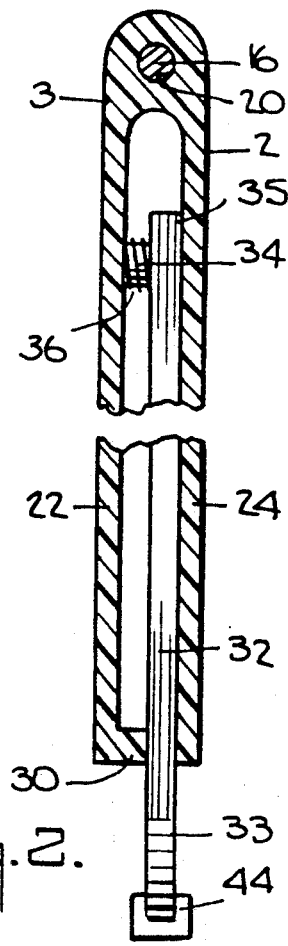
FIG. 2 is an enlarged sectional view of the sun visor of this invention taken along line 2—2 of FIG. 1.

The sun visor 2 is pivotally mounted on the arm 16 which has a circular cross section as shown in FIG. 2. A first end 18 of the arm 16 extends from the first side edge 17 of the visor 2 adjacent to the upper edge 22 of the visor.

The end 18 of the arm 16 terminates in a right angle section 19 which is pivotally secured in a mounting bracket 14 on the roof 6 in a known manner.

The arm 16 passes through a cylindrical channel 20 formed in the upper end or bridging section 26 of the visor 2 which extends from the left side edge 17 of the visor to the opposite right side edge 23 of the visor 2.

The channel 20 and the arm 16 are dimensioned so that the visor pivots about the arm 16 when moved but will be frictionally held in place at a desired angle set by the user in the usual manner.

The body 3 of the visor may be integrally formed of slightly flexible plastic such as polyethylene or other routinely used materials to form a first side wall 22 and the second side wall 24 which are spaced slightly apart as shown best in FIG. 2 and joined along the upper end section 26 as in which the cylindrical channel 20 is formed.

The first side wall 22 on the inner-face thereof along the periphery thereof has a projecting lip 30 extending toward the opposed second side wall 24, but spaced therefrom a distance 28 just slightly less than the thickness of the shield 32 so that the shield 32 is moveable by the user and will be frictionally held in place when released by the user.

The shield 32 is generally rectangular in form, however the outer end 33 is slightly rounded in the prefered embodiment shown since the usual pattern of sun rays is radial, but the specific shape of the outer end 33 is not particularly critical. A stud 34 located near the inside end 35 of the shield 32 extends perpendicularly therefrom towards the inside surface of the wall 22 and is dimensioned so as to frictionally engage the wall 22 to frictionally hold the shield 22 in a position desired by the user.

In the embodiment shown, a small compression spring 36 is placed around the stud 34 to produce a slight pressure against the wall 22 and shield 32 to further insure sufficient frictional interference to hold the shield 32 in a position fixed by the user.

The outer end 33 of the shield 32 is provided with a gripping handle 44 to facilitate movement by the user and is dimensioned to also act as a stop to assure that the outer end 33 of the shield 32 is always accessible and does not slip inwardly past the lip 30 of the wall 22.

The walls 22 and 24 may be covered on the outer surfaces with the usual padding and decorative finish materials as well as such known accessories such as cosmetic mirrors and courtesy lights.

The shield 32 is comprised of opaque plastic and the stud 34 and handle 44 preferably are molded integrally therewith.

In alternate embodiments, if desired, the shield may be darkly tinted transparent plastic with or without light polarizing characteristics.

The visor body 3 is preferably integrally molded of plastic so that the walls 22 and 24 and the lip 30 are of one piece of semi-rigid plastic, but flexible enough that the shield 32 may be inserted between the walls 22 and 24 by spreading them slightly along the lower edge.

In FIG. 1, the shield 32 is shown at a first position 46 extending from one end of the visor and in phantom at other positions 48, 50 and 52. It is apparent any number of positions may be fixed by the user depending upon the location of objectionable glare.

While the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. A vehicular sun visor comprising a generally rectangular visor body, said visor body being pivotally mounted at its upper edge to an arm, which arm is secured at one end to a vehicle, said visor body being comprised of a first rectangular wall and a second rectangular wall spaced apart slightly from said first wall along side edges and lower edges of each wall, said walls joined at upper edges, said walls having inner and outer surfaces, said first wall having a lip on its side edges and lower edge, said lip extending towards but spaced from the inner surface of said second wall, a generally rectangular panel shield slidingly mounted to said visor, said shield slidable towards or away from side and bottom edges of said visor body and frictionally held in a selected position and being slidingly and frictionally mounted to said visor between the inner surfaces of said walls.

2. A sun visor as claimed in claim 1 wherein said shield has a stud extending perpendicular from said shield towards said first wall, and said shield has a handle at its outer end.

3. A sun visor as claimed in claim 2 wherein spring means is mounted between the shield and first wall.

4. A sun visor as claimed in claim 3 wherein said spring means is a compression spring mounted over said stud.

5. A sun visor as claimed in any of claims 1–4 wherein said shield is opaque.

6. A sun visor as claimed in any of claims 1–4 wherein said shield is transparent and tinted.

* * * * *